(12) United States Patent
Gopalarathnam et al.

(10) Patent No.: US 10,148,516 B2
(45) Date of Patent: Dec. 4, 2018

(54) INTER-NETWORKING DEVICE LINK PROVISIONING SYSTEM

(71) Applicant: Dell Products L.P., Round Rock, TX (US)

(72) Inventors: Sudharsan Dhamal Gopalarathnam, Chennai (IN); Avinash Natarajan, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 438 days.

(21) Appl. No.: 14/811,501

(22) Filed: Jul. 28, 2015

(65) Prior Publication Data

US 2017/0034000 A1 Feb. 2, 2017

(51) Int. Cl.
*H04L 12/24* (2006.01)
*H04L 29/12* (2006.01)

(52) U.S. Cl.
CPC .......... *H04L 41/12* (2013.01); *H04L 41/0806* (2013.01); *H04L 41/0886* (2013.01); *H04L 61/6022* (2013.01)

(58) Field of Classification Search
CPC . H04L 41/12; H04L 41/0806; H04L 41/0886; H04L 61/6022
See application file for complete search history.

(56) References Cited

U.S. PATENT DOCUMENTS

| | | | | |
|---|---|---|---|---|
| 6,687,754 | B1* | 2/2004 | Sorensen | H04L 12/433 709/222 |
| 7,046,666 | B1* | 5/2006 | Bollay | H04L 29/12009 370/392 |
| 2003/0128706 | A1* | 7/2003 | Mark | H04L 12/2852 370/395.1 |
| 2004/0221041 | A1* | 11/2004 | Tabbara | H04L 67/1095 709/227 |
| 2007/0025253 | A1* | 2/2007 | Enstone | H04L 47/10 370/235 |
| 2009/0006635 | A1* | 1/2009 | Siegmund | H04L 29/12028 709/228 |
| 2009/0285215 | A1* | 11/2009 | Kaippallimalil | H04L 29/12028 370/392 |
| 2011/0219131 | A1* | 9/2011 | Allen | G06F 9/54 709/228 |

(Continued)

*Primary Examiner* — Philip J Chea
*Assistant Examiner* — Wuji Chen
(74) *Attorney, Agent, or Firm* — Haynes and Boone, LLP

(57) ABSTRACT

An inter-networking device link provisioning system includes an extending device. In response to a plurality of networking devices being connected to the extending device, the extending device provides each of the plurality of networking devices with an identity of the other of the plurality of networking devices that are connected to the extending device. When a first networking device and a second networking device are connected together and to the extending device, the first networking device receives a second device identity of the second networking device from the extending device and provisions an inter-networking device link with the second networking device, and the second networking device receives a first device identity of the first networking device from the extending device and provisions the inter-networking device link with the first networking device.

11 Claims, 9 Drawing Sheets

(56) References Cited

U.S. PATENT DOCUMENTS

| | | | | |
|---|---|---|---|---|
| 2012/0182872 A1* | 7/2012 | Wakunnoto | ........... | H04L 45/245 370/235 |
| 2012/0224576 A1* | 9/2012 | Gu | ..................... | H04L 61/2046 370/390 |
| 2012/0275297 A1* | 11/2012 | Subramanian | ........ | H04L 45/245 370/225 |
| 2013/0077529 A1* | 3/2013 | Lueckenhoff | ........... | H04L 67/16 370/255 |
| 2013/0223214 A1* | 8/2013 | Takaoka | .................. | H04L 49/30 370/230 |
| 2013/0336166 A1* | 12/2013 | Swain | ................. | H04L 61/2038 370/255 |
| 2014/0133486 A1* | 5/2014 | Sivasankar | ............. | H04L 47/41 370/392 |
| 2014/0325090 A1* | 10/2014 | Michelin | ............... | H04L 61/103 709/245 |

* cited by examiner

INTER-NETWORKING DEVICE LINK PROVISIONING SYSTEM

BACKGROUND

The present disclosure relates generally to information handling systems, and more particularly to providing a link between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, control bridges or other networking devices, may be connected together in various arrangements using a variety of protocols to allow for aggregating more than one distinct division of a network such as, for example, a domain, a Virtual Local Area Network (VLAN), etc. To aggregate multiple distinct divisions of the network, a first control bridge coupled to a first division of the network typically includes a first plurality of ports that are connected to nodes of the first division, and a second plurality of ports that are connected to a second control bridge that is similarly connected to a second division of the network. In some situations, port extension technology such as, for example, port extenders, may be provided with the control bridges to help increase the effective number of ports available to each control bridge. In situations where port extenders are provided with control bridges, it may be desirable to cluster the control bridges to provide a single, logical control bridge (made up of each of the clustered control bridges) that utilizes the ports on the port extender. Conventionally, such clustering of control bridges requires an administrator to manually provision a link between the control bridges in order to allow those control bridges to operate as a single, logical control bridge. Such manual provisioning by the administrator is time consuming and may be subject to error, particularly when a relatively large number of control bridges are clustered.

Accordingly, it would be desirable to provide an improved link provisioning system.

SUMMARY

According to one embodiment, an information handling system (IHS) includes a networking device port; an extending device port; a processing system that is coupled to the networking device port and the extending device port; and a memory system that is coupled to the processing system and that includes instruction that, when executed by the processing system, cause the processing system to provide a linking engine that is configured to: receive, from an extending device that is coupled to the extending device port, an identity of a networking device that is coupled to the extending device; and determine, using the identity of the networking device that is coupled to the extending device, that the networking device is connected to the networking device port and, in response, provision an inter-networking device link with the networking device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
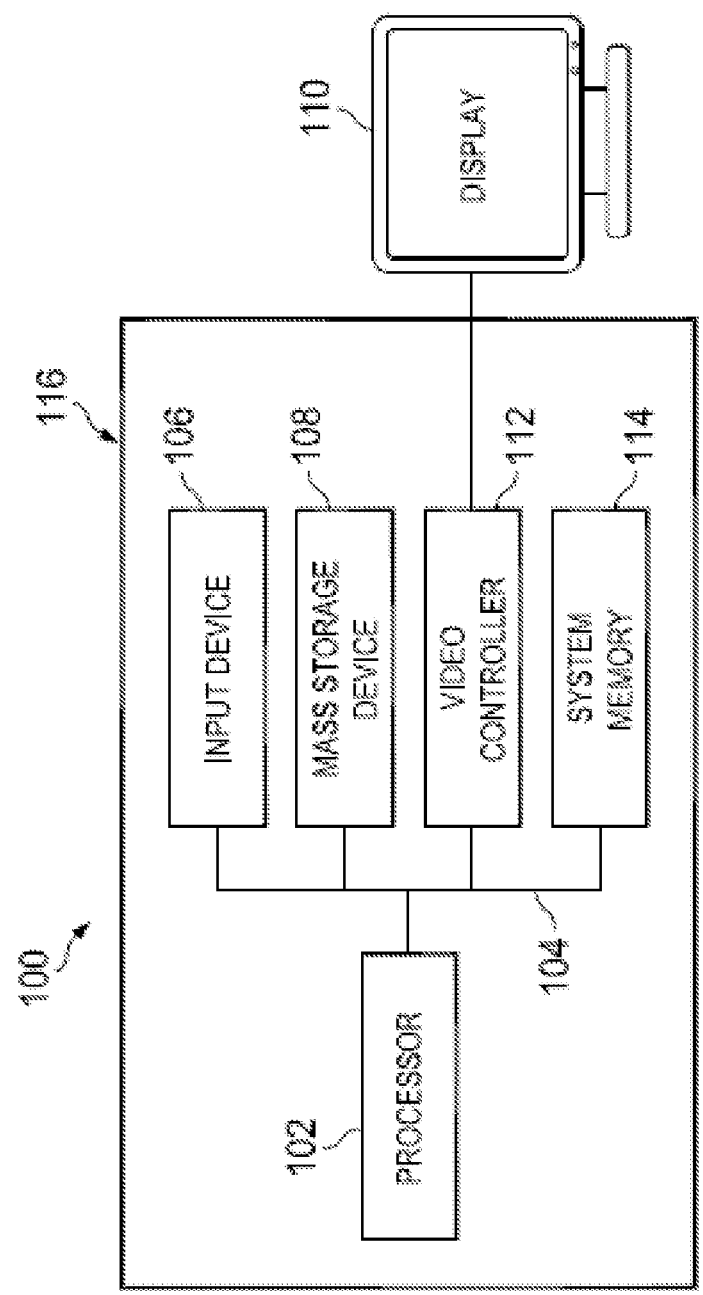
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
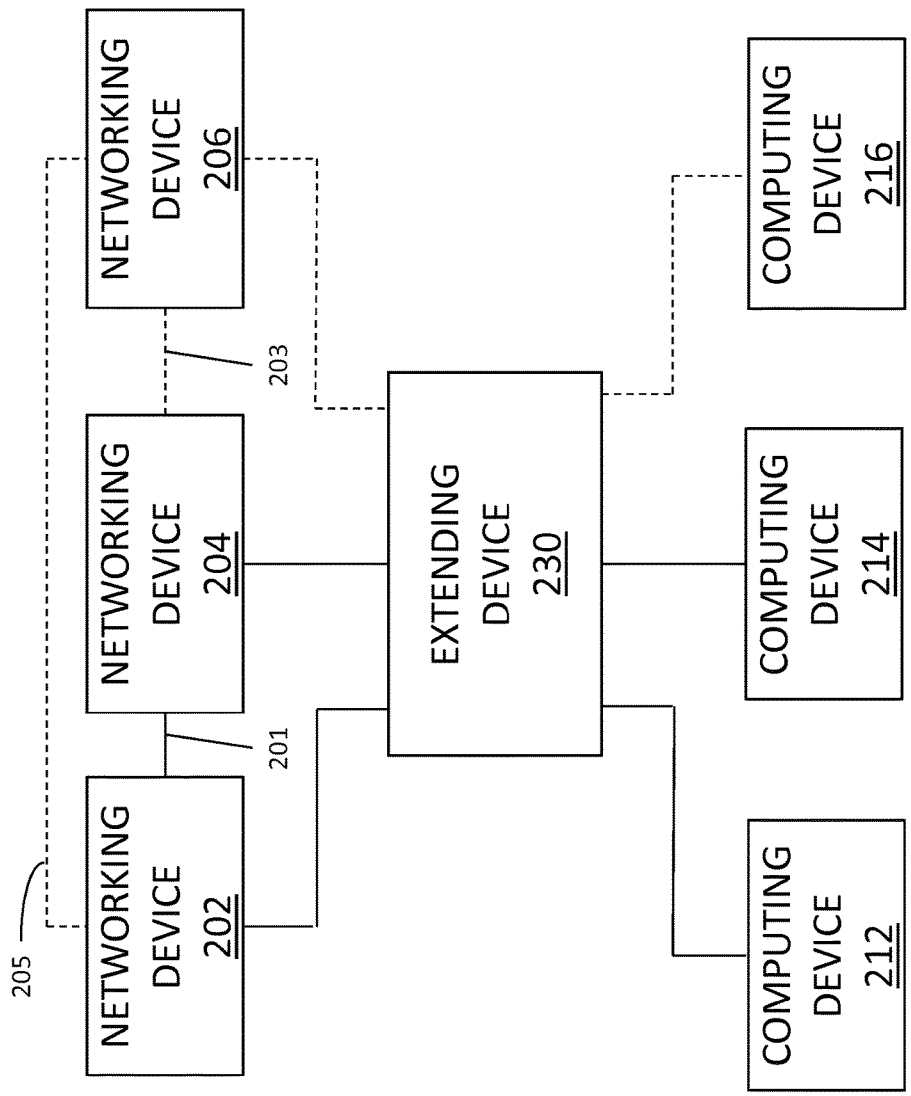
FIG. 2 is a schematic view illustrating an embodiment of an inter-networking device link provisioning system.

Referring now to FIG. 2, an embodiment of an inter-networking device link provisioning system 200 is illustrated. In an embodiment, the system 200 may be the IHS 100 discussed above with reference to FIG. 1 and/or may include some or all of the components of the IHS 100. In the illustrated embodiment, the system 200 includes an extending device 230 coupled to a plurality of networking devices 202, 204, and up to 206, as well as coupled to a plurality of computing device 212, 214, and up to 216. For example, the couplings between the extending device 230 and the networking devices 202-206 and/or computing devices 212-216 may be provided using networking cabling such as, for example, one or more Ethernet cables and/or other networking couplings known in the art. While only three networking devices and three computing devices are illustrated in the embodiment of FIG. 2, any number of networking devices and computing devices may be coupled to the extending device 230 in the system 200 while remaining within the scope of the present disclosure.

In some embodiments, any of the networking devices 202-206 may be also coupled to the other networking devices in the system 200 via at least one coupling. For example, in the illustrated embodiment, the networking device 202 is coupled to the networking device 204 via a coupling 201 and to the networking device 206 via a coupling 205; and the networking device 204 is coupled to the networking device 206 via a coupling 203. For example, the couplings between the networking devices 202-206 may be provided using networking cabling such as, for example, one or more Ethernet cables and/or other networking couplings known in the art. However, one of skill in the art in possession of the present disclosure will recognize that the coupling discussed below between each of the networking devices 202-206 of the system 200 may be provided in a variety of manners to allow for the functionality of the inter-networking device link discussed below.

The networking devices 202, 204, and 206 and the extending device 230 are discussed in further detail below with reference to FIG. 3 and FIG. 4 respectively. However, in general, the networking devices 202-206 and the extending device 230 may be provided in a variety of different types of inter-networking device link provisioning systems that may be configured to perform the link provisioning functionality discussed below. In the embodiments discussed below, the computing devices 212, 214, or 216 are not discussed in detail, but each may be the IHS 100 discussed above with reference to FIG. 1 and/or may include some or all of the components of the IHS 100. For example, the computing devices 212-216 may be desktop computers, laptop/notebook computers, tablet computers, phones, wireless access points, and/or a variety of other computing devices known in the art. In some alternative embodiments, any of the computing devices 212-216 may be implemented as an extending device that is similar to the extending device 230 and that performs the port extension functionality discussed below.

Figure 3:
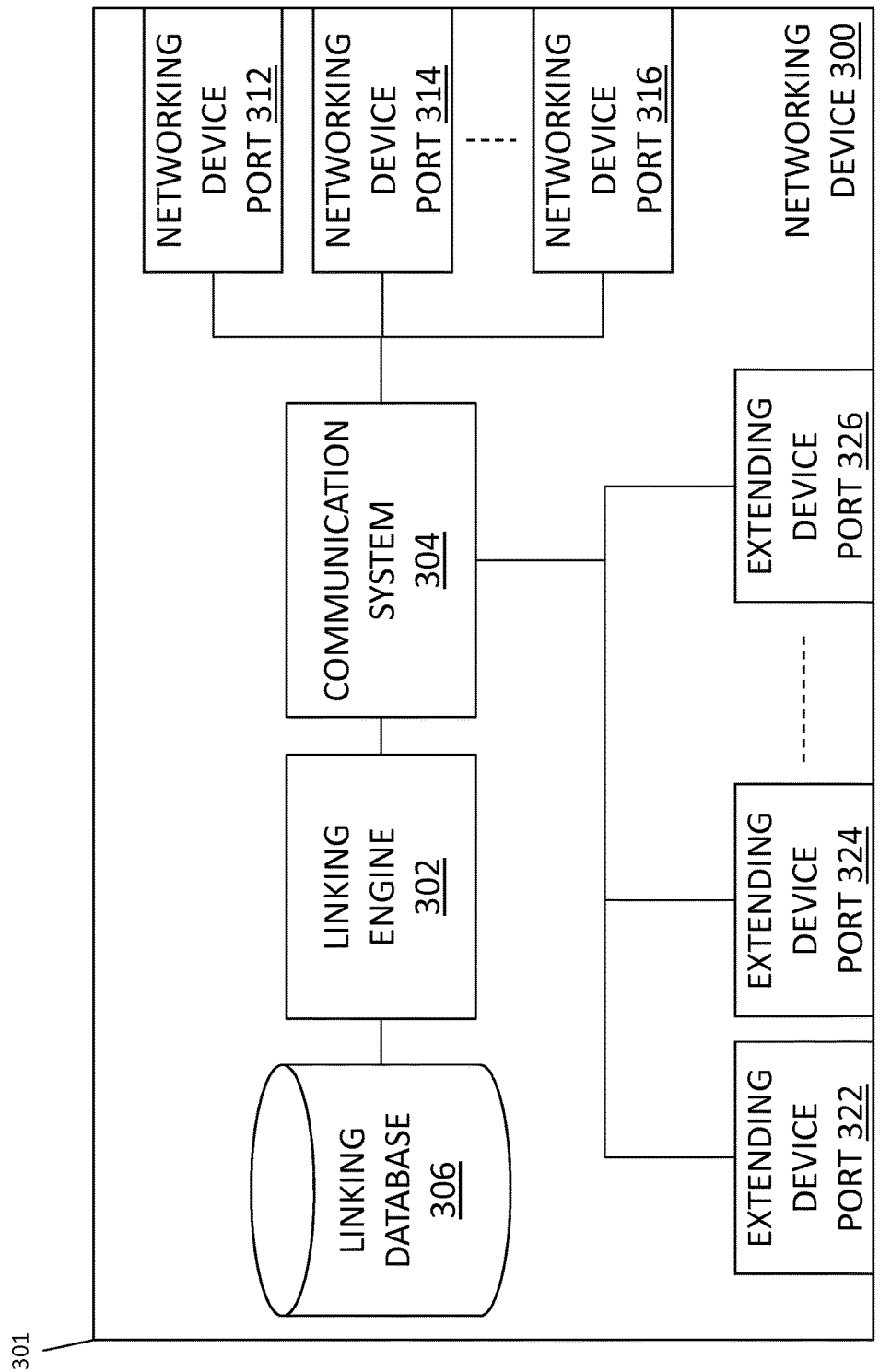
FIG. 3 is a schematic view illustrating an embodiment of a networking device used in the inter-networking device link provisioning system of FIG. 2.

Referring now to FIG. 3, an embodiment of a networking device 300 is illustrated. In an embodiment, the networking device 300 may be, for example, any of the networking devices 202, 204, and 206 in the system 200 of FIG. 2. In an embodiment, the networking device 300 may be the IHS 100 discussed above with reference to FIG. 1 and/or may include some or all of the components of the IHS 100. In specific examples discussed below, the networking device 300 is a control bridge that provides a variety of control bridging functionality known in the art. For example, control bridging functionality may include aggregating more than one distinct division of a network such as, for example, a domain, a Virtual Local Area Network (VLAN), etc. More specifically, a control bridge may adhere to a particular standard or protocol that controls the operation of a logical switch that includes one or more control bridges and one or more port extenders, and may operate to interconnect multiple distinct divisions of a network such as domains, Local Area Networks (LANs), Virtual Local Area Network (VLANs), etc. However, in other embodiments, the networking device 300 may be provided by a variety of other networking systems (e.g., switches, routers, etc.) known in the art while remaining within the scope of the present disclosure.

The networking device 300 includes a chassis 301 that houses a processing system (not illustrated, but which may include one or more of the processor 102 discussed above with reference to FIG. 1) and a memory system (not illustrated, but which may include system memory 114 discussed above with reference to FIG. 1) that includes instructions that, when executed by the processing system, cause the processing system to provide an linking engine 302 that is configured to perform the functions of the linking engines and/or networking devices discussed below. The networking device 300 also includes a communication system 304 that is housed in the chassis 301, coupled to the linking engine 302 (e.g., via a coupling between the processing system and the communication system), and coupled to a plurality of networking device ports and a plurality of extending device ports. As illustrated, the communication system 304 is coupled to networking device ports 312, 314, and up to 316, and to extending device ports 322, 324, and up to 326. In an embodiment, the networking device ports 312-316 and/or extending device ports 322-326 may be Ethernet ports and/or a variety of other networking ports known in the art. In the embodiments discussed below, the networking device ports 312-316 couple other networking devices of the system 200, and the extending device ports 322-324 couple to extending devices (e.g., the extending device 230 discussed above with respect to FIG. 2). As such, the communication system 304 may include a variety of communication system components such as, for example a Network Interface Controller (NIC), buses connected to one or more of the ports, a wireless communication device, and/or a variety of other communication system components known in the art for communicating with networking devices and extending devices as discussed below.

The networking device 300 also includes a linking database 306 that is housed in the chassis 301, coupled to the linking engine 302, and configured to store a variety of link provisioning information that may depend on the specific functionality desired by the system 200 that is discussed below. In an embodiment, the linking database 306 may be included on a storage device (e.g., the storage device 108 discussed above with reference to FIG. 1) that is coupled to the linking engine 302 (e.g., via a coupling to the processing system). While the linking database 206 is illustrated as part of the networking device 300 (e.g., in a storage device included in the networking device 300), in some embodiments, the linking database 306 may be included as being a separate component from the networking device 300 in FIG. 3 while remaining within the scope of the present disclosure. Furthermore, any type of database provided on any storage subsystem that is accessible by the networking device 300 is envisioned as falling within the scope of the present disclosure.

In some embodiments, the link provisioning information stored in the linking database 306 may include mapping information that associates one or more different networking device (i.e., other than the networking device 300) with the networking device 300, and/or may include a variety of other associations that provide the functionality discussed below. For example, the networking device 300 may be coupled to a networking device A through the networking device port 312, and may be coupled to a networking device B through the networking device port 316. As such, the mapping information in the linking database 306 may associate the networking device A and/or the identity of the networking device A (e.g., using a Media Access Control (MAC) address of the networking device A) with the networking device port 312, and may associate the networking device B and/or the identity of the networking device B with the networking device port 316, as discussed in further detail below.

Figure 4:
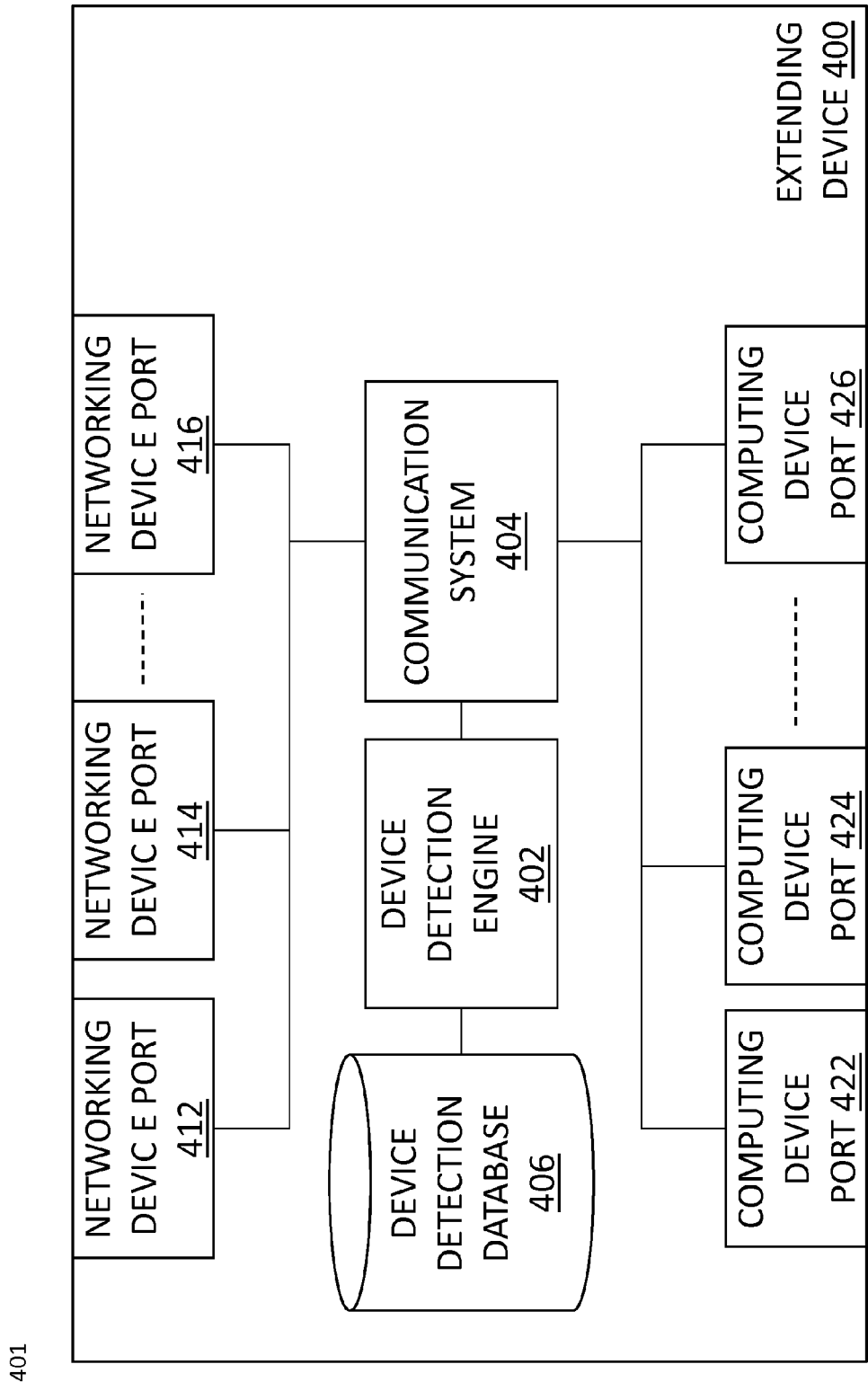
FIG. 4 is a schematic view illustrating an embodiment of an extending device used in the inter-networking device link provisioning system of FIG. 2.

Referring now to FIG. 4, an embodiment of an extending device 400 is illustrated. In an embodiment, the extending device 400 may be the extending device 230 discussed above in the system 200 of FIG. 2. In an embodiment, the extending device 400 may be the IHS 100 discussed above with reference to FIG. 1 and/or may include some or all of the components of the IHS 100. In specific embodiments discussed below, the extending device 400 is described as a port extender that provides a plurality of ports for use by a control bridge (e.g., the networking devices 202-206). However, in other embodiments, the extending device 400 may be a variety of other computing device that are configured to be coupled to networking devices that utilize inter-networking device links, as discussed in further detail below. In some embodiments, such a networking device for which additional port(s) are provided by an extending device may be referred to as an uplink networking device, a control bridge/switch, or other networking device terms known in the art.

The extending device 400 includes a chassis 401 that houses a processing system (not illustrated, but which may include one or more of the processor 102 discussed above with reference to FIG. 1) and a memory system (not illustrated, but which may include system memory 114 discussed above with reference to FIG. 1) that includes instructions that, when executed by the processing system, cause the processing system to provide a device detection engine 402 that is configured to perform the functions of the device detection engines and/or extending devices discussed below. The extending device 400 also includes a communication system 404 that is housed in the chassis 401, coupled to the device detection engine 402 (e.g., via a coupling between the processing system and the communication system 404), and coupled to a plurality of networking device ports and a plurality of computing device ports. As illustrated in the embodiment of FIG. 4, the communication system 404 is coupled to networking device ports 412, 414, and up to 416, and to computing device ports 422, 424, and up to 426. In an embodiment, the networking device ports 412-416 and/or computing device ports 422-426 may be Ethernet ports and/or a variety of other networking ports known in the art. In the embodiments discussed below, the networking device ports 412, 414, and 416 couple to networking devices of the system 200, and the computing device ports 212-216 couple to computing devices or other extending devices of the system 200. As such, the communication system 404 may include a variety of communication system components such as, for example a Network Interface Controller (NIC), buses connected to one or more of the ports, a wireless communication device, and/or a variety of other communication system components known in the art for communicating with the networking devices and computing devices.

The extending device 400 includes a device detection database 406 that is housed in the chassis 401, coupled to the device detection engine 402, and configured to store a variety of device detection information that may depend on the specific functionality desired by the system 200 that is discussed below. In an embodiment, the device detection database 406 may be included on a storage device (e.g., the storage device 108 discussed above with reference to FIG. 1) that is coupled to the device detection engine 402 (e.g., via a coupling between the processing system and the storage device). While the device detection database 406 is illustrated as part of the extending device 400 (e.g., in a storage device included in the networking device 300), in some embodiments, the device detection database 406 may be included as being a separate component from the extending device 400 in FIG. 4 while remaining within the scope of the present disclosure. Furthermore, any type of database provided on any storage subsystem that is accessible by the extending device 400 is envisioned as falling within the scope of the present disclosure.

In some embodiments, the device detection information stored in the device detection database 406 may include identifying information for a networking device and/or a computing device that is coupled to the extending device. For example, such identifying information may include a Media Access Control (MAC) address of a device, an Internet Protocol (IP) address of a device, a serial number of a device, and/or a variety of other identifying information known in the art for the networking device and/or a computing device that is coupled to the extending device.

Figure 5:
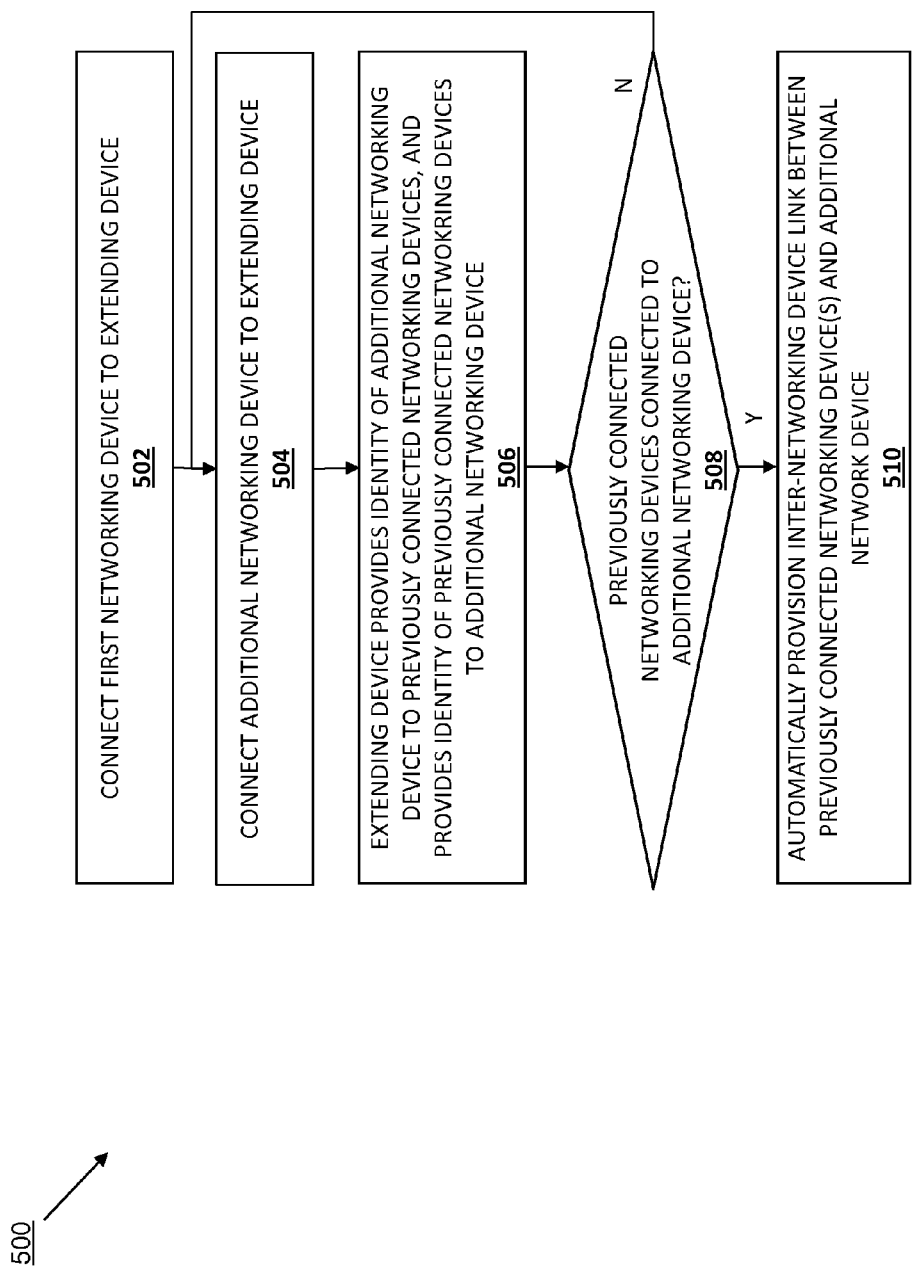
FIG. 5 is a flow chart illustrating an embodiment of a method for providing an inter-networking device link.

Referring now to FIG. 5, and with reference to FIGS. 6a, 6b, 6c, and 6d, an embodiment of a method 500 for providing an inter-networking device link is illustrated. As discussed below. It may be desirable for networking devices such as, for example, a control bridges, to utilize additional ports available on a connected extending device. The method 500 provides for the linking of such networking devices by having the extending device share the identity of each networking device coupled to the extending device with other networking devices connected to the extending device, which allows coupled-together networking devices to configure their networking device ports to automatically provision an inter-networking device link such as, for example, a link aggregation group (LAG), between the coupled-together networking devices. Such techniques may be especially useful for a large inter-networking device link provisioning systems that may include a relatively large number of control bridges and/or other networking devices coupled to one or more extending devices. For the purpose of clarity, each of the networking devices in the following discussion is described as a control bridge even though those networking device may be provided by a variety of other networking systems (e.g., switches, routers, etc.) known in the art while remaining within the scope of the present disclosure.

Figure 6A:
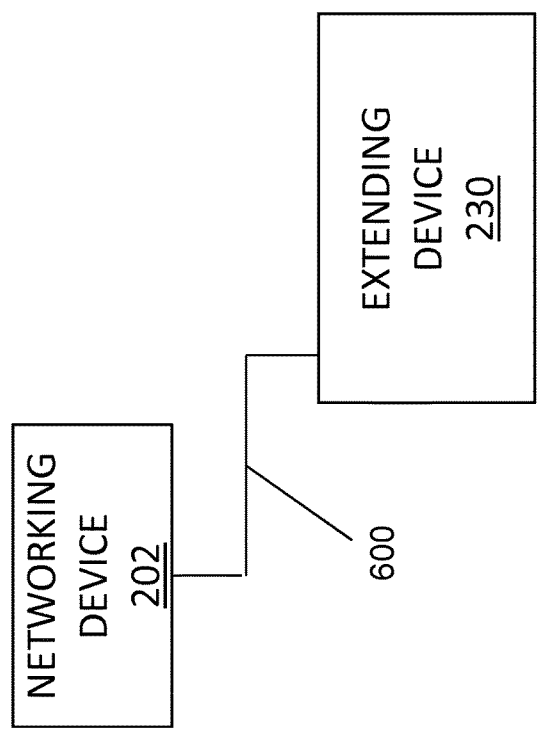
FIG. 6a is a schematic view illustrating an embodiment of the inter-networking device link provisioning operating according to the method of FIG. 5.
Figure 6B:
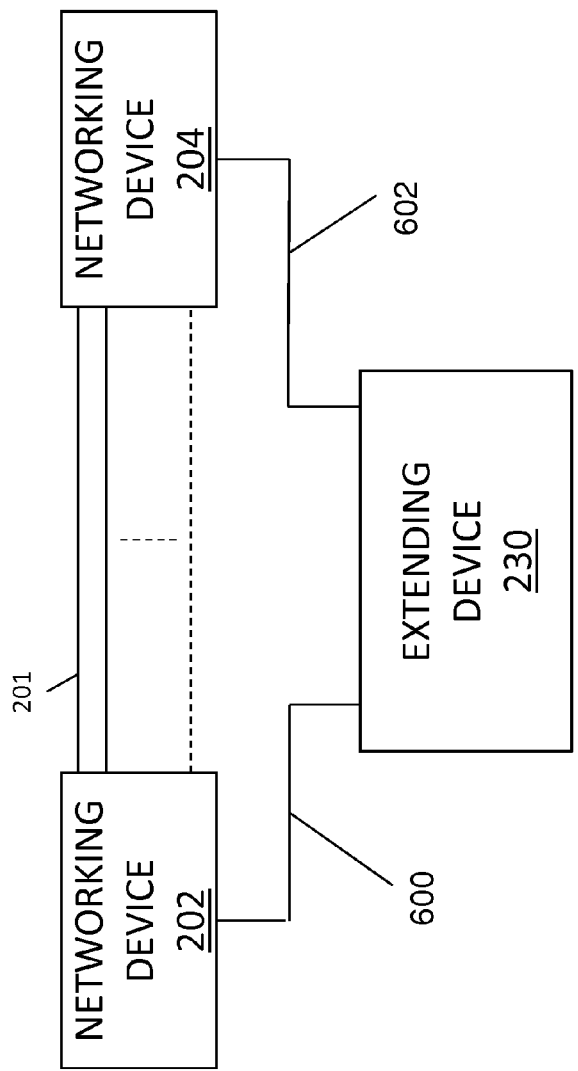
FIG. 6b is a schematic view illustrating an embodiment of the inter-networking device link provisioning operating according to the method of FIG. 5.

The method 500 begins at block 502 where a first networking device is connected to an extending device. As illustrated in FIG. 6b, the first networking device 202/300 may be connected to the extending device 230/400 via a coupling 600 that connects an extending device port on the networking device 202/300 to a networking device port on the extending device 230/400. For example, a networking cable (e.g., an Ethernet cable) may be connected to one of the extending device ports 322, 324, and up to 326 on the networking device 300, and to one of the networking device ports 412, 414, and up to 416 on the extending device 400. In response to the first networking device 202/300 being connected to the extending device 230/400, the device detection engine 402 in the extending device 230/400 may receive and/or retrieve an identity of the first networking device 202/300 from the first networking device 202/300, and store the identifying information in the device detection database 406 of the extending device 230/400. In some embodiments, the device detection engine 402 may in-situ update the identifying information stored in the device detection database 406 in response to a networking device/computing device being connected to the extending device 230/400. For example, the updating of the identifying information after the first networking device 202/300 is connected to the extending device 230/400 may include updating the identity of the first networking device and/or the updating of which the networking device ports 412, 414, and up to 416 is connected to the first networking device 202/300. In some embodiments, the identity of the first networking device may include a Media Access Control (MAC) address, an Internet Protocol (IP) address, a serial number, and/or a variety of other identifying information for the first networking device known in the art. For example, a Port Extender Configuration and Status Protocol (PE-CSP) Protocol Data Unit (PDU) sent by the networking device 202 to the extending device 230 may include a MAC address of the networking device 202.

The method 500 continues at block 504 where an additional networking device is connected to the extending device. In some embodiments, the additional networking device may be implemented as the networking device 300 or any of the networking devices 202, 204, and up to 206 described above. However, for the purpose of clarity, in the following discussion, the first networking device described with respect to block 502 is referred as networking device 202 and the additional networking device is referred as networking device 204. Referring now to FIG. 6b, at block 504, the networking device 204/300 is connected to the extending device 230/400 via a coupling 602 that connects an extending device port on the networking device 202/300 to a networking device port on the extending device 230/400. Similarly as discussed with reference to block 502, in response to the additional networking device 204 being connected to the extending device 230/400 at block 504, the device detection engine 402 may receive and/or retrieve an identity of the additional networking device 204 from the additional networking device 204 and store the identifying information in the device detection database 406. In response to the additional networking device 204 being connected to the extending device 230/400, the updated identifying information may include the identity of the additional networking device and/or of which of the networking device ports 412, 414, and up to 416 is connected to the additional networking device 204. In some embodiments, the identity of the additional networking device 204 may include a Media Access Control (MAC) address, an Internet Protocol (IP) address, a serial number, and/or a variety of other identifying information for the second networking device 204 known in the art. For example, a Port Extender Configuration and Status Protocol (PE-CSP) Protocol Data Unit (PDU) sent by the networking device 204 to the extending device 230 may include a MAC address of the networking device 204.

Although in the current example of block 504 discussed above, only one additional networking device (i.e., 204) is connected to the extending device 230/400, in some embodiments, multiple additional networking devices may be connected to the extending device 230/400 through the networking device ports 412, 414, and up to 416. Accordingly, the device detection engine 402 may update the device detection database 406 after each additional networking device is connected to the extending device 230/400. As such, the device detection database 406 may periodically be provided the most updated identifying information of connected networking device(s).

The method 500 proceeds to block 506 where the extending device provides an identity of the additional networking device (e.g., the networking device 204) to a previously connected networking device (e.g., the first networking device 202), and provides the identity of the previously connected networking devices to the additional networking device. Using the example above in which the networking device 204 (i.e., the additional networking device) was connected to the extending device 230/400 after the first networking device 202 (i.e., the previously connected networking device) was connected to the extending device 230/400, the device detection engine 402 may provide/transmit the identity of the networking device 204 to the networking device 202 (and any other previously connected networking devices) through the coupling 600 using the communication system 404, and provide/transmit the identity of the networking device 202 (and any other previously connected networking devices) to the networking device 204 through the coupling 602 using the communication system 404. In different embodiments, the device detection engine may retrieve the identity of the networking device 202 from the device detection database 406, retrieve the identity of the networking device 204 from the device detection database 406, provide the identity of the networking device 204 to the networking device 202 immediately upon receiving/retrieving it, etc. In embodiments where multiple additional networking devices have been connected to the extending device 230/400, the device detection engine 402 may transmit each of the identities of the newly connected networking devices to the previously connected networking device(s), and vice versa, in a similar manner.

Referring still to block 506, in addition to providing the identity of the newly connected additional networking device to the previously connected networking device, the device detection engine 402 may further provide instruction(s), protocol(s), and/or other commands to the previously connected networking device to discover the newly connected additional networking device, and to the newly connected additional networking device to discover the previously connected networking device. In some embodiments, the instructions, protocols, and/or other commands may include providing the identity of the additional networking device and previously connected networking device in a type-length-value (TLV) element in a communication protocol. As such, in response to receiving the identity of the additional networking device in the TLV element the previously connected networking devices may be configured to automatically attempt to discover that additional networking device, and in response to receiving the identity of the previously connected networking device in the TLV element the newly connected additional networking devices may be configured to automatically attempt to discover the previously connected networking devices.

The method 500 proceeds to decision block 508 where it is determined whether the previously connected networking device (e.g., networking device 202) is connected to the additional networking device (e.g., networking device 204). In some embodiments, the linking engine 302 of the networking device 202 receives the identity of the networking device 204 through the communication system 304 and accesses the linking database 306 to retrieve mapping information. As described above, the mapping information may include information identifying the networking device 202 coupled to the networking device ports on the networking device 204. For example, the mapping information may specify that the networking device 204 is coupled to the networking device 202 via networking device ports 312 and 314 on the networking device 202. In an embodiment, the linking engine 302 of the networking device 202 may have previously exchanged discovery protocol data (e.g., Link Layer Discovery Protocol (LLDP) packets) with the networking device 204 through the networking device ports 312 and 314 on the networking device 202 to determine the mapping information. In other embodiments, in response to receiving the identity of the additional networking device, the linking engine 302 of the networking device 202 may send the discovery protocol data to the networking device 204 through the networking device ports 312 and 314 on the networking device 202 to determine whether the networking device 204 is connected to the networking device 202. One of skill in the art in possession of the present disclosure will recognize how the linking engine 302 in the networking device 204 may operate to determine whether the networking device 204 is connected to the networking device 202 in a similar manner If, at decision block 508, it is determined that the previously connected networking device is connected to the additional networking device it, the method 500 proceeds to block 510 where an inter-networking device link is automatically provisioned between the previously connected networking device and the additional networking device. In some embodiments, after the linking engines 302 of the networking devices 202 and 204 determines that the networking device 202 and the networking device 204 are connected, the linking engines 302 in the networking devices 202 and 204 may automatically provision an inter-networking device link between the networking devices 202 and 204. If, at decision block 508, the linking engines 302 in the networking devices 202 and 204 determine that the networking device 202 and the networking device 204 are not connected, the method 500 proceeds back to block 504 an additional networking device may be connected to the extending device 230.

Referring back to FIG. 6b, an embodiment of an additional networking device connected to the extending device and a previously connected networking device in the inter-networking device link provisioning system is illustrated. As discussed above, the networking device 204 may be coupled to the networking device 202 via at least one coupling 201. As discussed above, the device detection engine 402 in the extending device 230 may have retrieved an identity of the networking device 204 and provided that identity to the networking device 202, as well as retrieved the identity of the networking device 202 and provided that identity to the networking device 204. The networking device 202 may then have determined that the networking device 204 is coupled to one or more networking device ports on the networking device 202 via the coupling(s) 201, and the networking device 204 may have determined that the networking device 202 is coupled to one or more networking device ports on the networking device 204 via the coupling(s) 201.

Figure 6C:
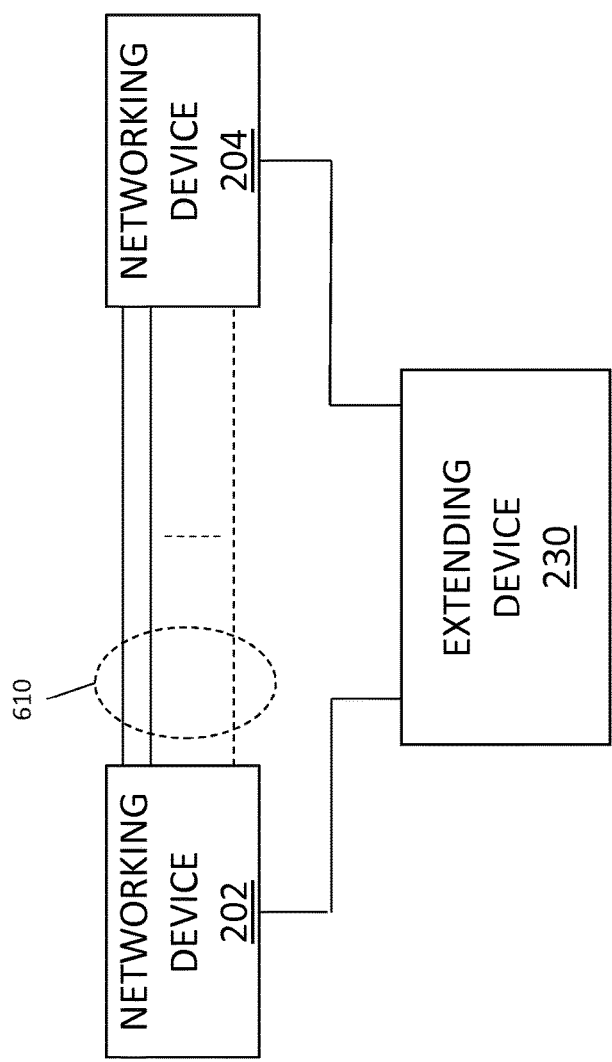
FIG. 6c is a schematic view illustrating an embodiment of the inter-networking device link provisioning operating according to the method of FIG. 5.

Referring now to FIG. 6c, an embodiment of an inter-networking device link 610 provided between the networking device 202 and the networking device 204 (i.e., as discussed above with reference to block 510) is illustrated. As discussed above, after the linking engines 302 in the networking devices 202 and 304 determine that the networking device 202 and the networking device 204 are connected, the linking engines 302 may provision the networking port(s) that are connected to coupling(s) 201 to automatically provision the inter-networking device link 610. In some embodiments, the inter-networking device link 610 may include a first link aggregation group (LAG) (e.g., a reserved inter-chassis link LAG between the networking devices 202 and 204) that groups a plurality of the networking ports 312-316 on the networking device 202, and a second LAG (e.g., the reserved inter-chassis link LAG between the networking devices 202 and 204) that groups a plurality of the networking ports 312-316 on the networking device 204, with each of the first LAG and the second LAG connected to the physical couplings 210 between the networking devices 202 and 204.

Figure 6D:
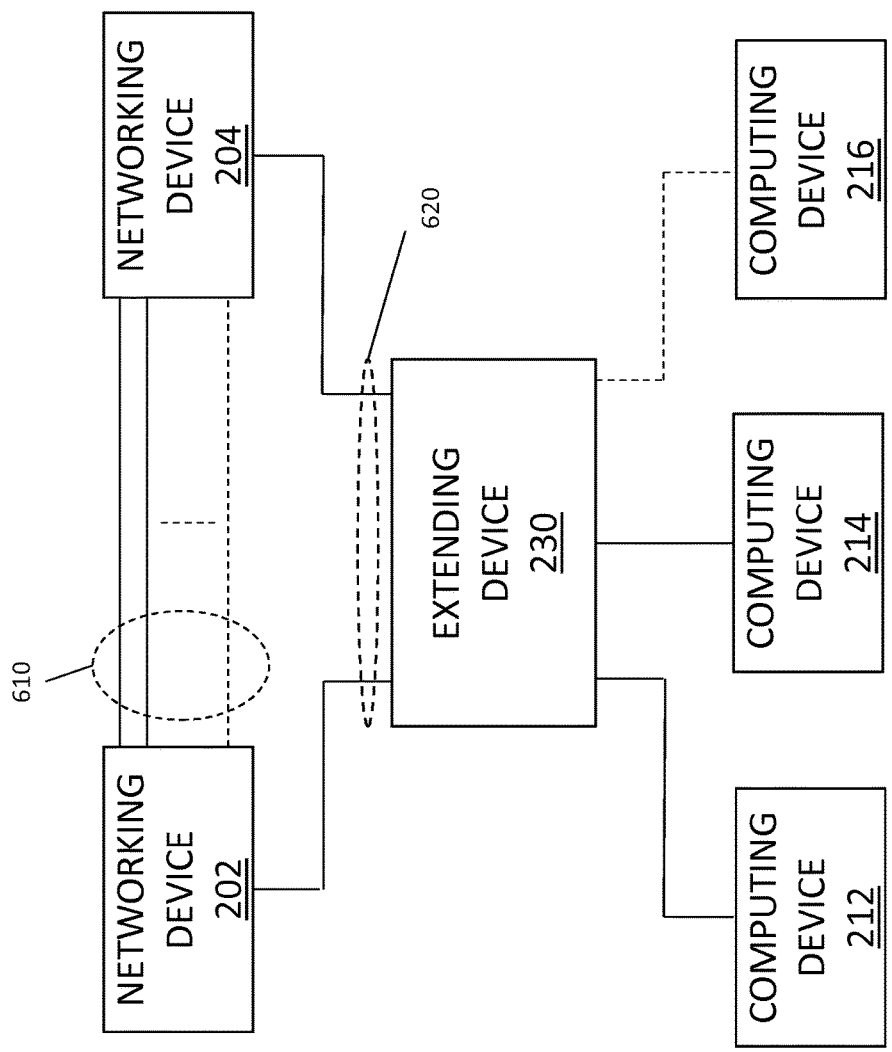
FIG. 6d is a schematic view illustrating an embodiment of the inter-networking device link provisioning operating according to the method of FIG. 5.

Subsequent to the automatic provisioning of the inter-networking device link 610, the extending device 230 may provide for data transfer between the networking devices 202 and 204 and one or more computing devices coupled to the computing device ports (e.g., 422, 424, and up to 426) of the extending device 230. Referring now to FIG. 6d and continuing the example described above with respect to FIGS. 6a, 6b, and 6c, computing devices 212, 214, and up to 216 are connected to the extending device 230, and may operate to send data to, and receive data from, the networking devices 202 and 204 through the extending device 230. In an embodiment, a plurality of conventional operations may then be performed by the inter-networking device link provisioning system. For example, conventional control bridge clustering, virtual trunk linking (VLT), and/or other aggregation operations may be performed to provide an aggregated link (e.g., a VLT LAG) 620 on the extending device 230 with the networking device 202 and 204, as illustrated in FIG. 6d.

Although illustrative embodiments have been shown and described, a wide range of modification, change and substitution is contemplated in the foregoing disclosure and in some instances, some features of the embodiments may be employed without a corresponding use of other features.

Accordingly, it is appropriate that the appended claims be construed broadly and in a manner consistent with the scope of the embodiments disclosed herein.

What is claimed is:

1. An inter-networking device link provisioning system, comprising:
    an extending device that is configured, in response to a plurality of networking devices being connected to the extending device, to provide each of the plurality of networking devices that are connected to the extending device with an identity of the other of the plurality of networking devices that are connected to the extending device;
    a first networking device that is connected to the extending device; and
    a second networking device that is connected to the extending device and the first networking device;
    wherein the first networking device is configured to:
        send and receive discovery protocol data through at least one port on the first networking device that is connected to the second networking device to determine that the second networking device is connected to the at least one port on the first networking device; and
        receive a second device identity of the second networking device from the extending device and, in response, provision an inter-networking device link with the second networking device by provisioning the at least one port on the first networking device to provide the inter-networking device link; and
    wherein the second networking device is configured to:
        send and receive discovery protocol data through at least one port on the second networking device that is connected to the first networking device to determine that the first networking device is connected to the at least one port on the second networking device; and
        receive a first device identity of the first networking device from the extending device and, in response, provision the inter-networking device link with the first networking device by provisioning the at least one port on the second networking device to provide the inter-networking device link.

2. The system of claim 1, wherein the extending device is configured to receive a Media Access Control (MAC) address from each of the plurality of networking devices that are connected to the extending device to determine the identity of each of the plurality of networking devices that are connected to the extending device, and wherein the extending device is configured to provide a second device MAC address of the second networking device to the first networking device, and provide a first MAC address of the first networking device to the second networking device.

3. The system of claim 1, wherein the first networking device is configured to provision a plurality of ports on the first networking device to provide a first link aggregation group (LAG) that provides the inter-networking device link; and
    wherein the second networking device is configured to provision a plurality of ports on the second networking device to provide a second LAG that provides the inter-networking device link.

4. The system of claim 1, wherein the extending device is configured to instruct each of the plurality of networking devices that are connected to the extending device to discover the other of the plurality of networking devices that are connected to the extending device.

5. The system of claim 1, wherein the extending device is configured to provision an aggregated link to the first networking device and the second networking device that are different physical or logical networking devices.

6. A method for providing an inter-networking device link, comprising:
    sending, by the first networking device, first discovery protocol data through a networking device port of the first networking device that is connected to a second networking device, wherein the second networking device receives the first discovery protocol data through a networking device port of the second networking device that is connected to the first networking device;
    receiving, by the first networking device through the networking device port of the first networking device, second discovery protocol data from the second networking device that was sent through the networking device port of the second networking device that is connected to the first networking device;
    receiving, by a first networking device from an extending device that is coupled to an extending device port of the first networking device, a second device identity of a second networking device that is coupled to the extending device;
    determining, by the first networking device using the identity of the second networking device and the second discovery protocol data that the second networking device connected to the networking device port of the first networking device; and
    provisioning, by the first networking device in response to determining that the second networking device is connected to the networking device port, an inter-networking device link with the second networking device by provisioning the networking port on the first networking device to provide the inter-networking device link, wherein the second networking device provisions the inter-networking device link with the first networking device in response to determining that the first networking device is connected to the networking device port of the second networking device using a first device identity of the first networking device received from the extending device that is coupled to an extending device port of the second device and the first discovery protocol data.

7. The method of claim 6, wherein the receiving the identity of the second networking device includes receiving a Media Access Control (MAC) address of the second networking device.

8. The method of claim 6, wherein the provisioning the inter-networking device link with the second networking device includes providing a link aggregation group (LAG) on a plurality of networking device ports on the first networking device that are coupled to the second networking device.

9. The method of claim 6 further comprising:
    receiving, by the first networking device from the extending device through the extending device port, an instruction to discover the second networking device.

10. The method of claim 9, wherein the receiving the instruction includes receiving a type-length-value (TLV) element.

11. The method of claim 6, further comprising:
    provisioning, by the extending device, an aggregated link to the first networking device and the second networking device that are different physical or logical networking devices.

* * * * *